United States Patent [19]
Daurio et al.

[11] Patent Number: 5,809,412
[45] Date of Patent: Sep. 15, 1998

[54] SYSTEM FOR DETECTING A FRAUDULENT REMOTE UNIT WHICH UPON DETECTION PLACES A CALL TO THE CELLULAR INFRASTRUCTURE USING IDENTIFICATION IN FORMATION OF THE FRAUDULENT REMOTE UNIT

[75] Inventors: Suzanne Daurio, McHenry; Michael Duda, Naperville; Tom Joyner, Chicago; Eric Drury, Lake Zurich, all of Ill.

[73] Assignee: Motorola, Inc., Schaumburg, Ill.

[21] Appl. No.: 716,590

[22] Filed: Sep. 18, 1996

[51] Int. Cl.$^6$ ............................... H04Q 7/00; H04Q 9/00
[52] U.S. Cl. ............................ 455/410; 455/411
[58] Field of Search .................... 455/410, 411, 455/425, 67.1; 380/23, 25; 324/76.12; 379/189

[56] References Cited

U.S. PATENT DOCUMENTS

| | | | |
|---|---|---|---|
| 4,955,049 | 9/1990 | Ghisler | 379/58 |
| 5,005,210 | 4/1991 | Ferrell | 455/115 |
| 5,329,591 | 7/1994 | Magrill | 380/25 |
| 5,345,595 | 9/1994 | Johnson et al. | 455/33.1 |
| 5,420,910 | 5/1995 | Rudokas et al. | 379/59 |
| 5,555,551 | 9/1996 | Rudokas et al. | 379/59 |

FOREIGN PATENT DOCUMENTS 3441724  5/1986  Germany.

OTHER PUBLICATIONS

"EMX 2500 Features and Enhancements" section #68P09222A54–O, Motorola's Clone Clear™, Technical Education and Documentation, Aug. 14, 1994.

"PhonePrint™, Cellular Fraud Control System Description", Corsair Communications.

*Primary Examiner*—Tommy P. Chin
*Assistant Examiner*—David R. Vincent
*Attorney, Agent, or Firm*—Kenneth A. Haas

[57] ABSTRACT

Detection of a fraudulent remote unit (113) in a communication system (100) occurs by external fraud detection equipment (103) located external to, and in proximity to a base site (101). External fraud detection equipment (103) communicates with base site (101) via an uplink communication signal (105) and utilizes fraud detection methods not utilized by internal fraud detection equipment (111) to identify the remote unit (113) as being fraudulent. Once the remote unit (113) is identified by the external fraud detection equipment (103) as being fraudulent, the external fraud detection equipment (103) places an origination order to the base site (101) and supplies identification information on the fraudulent remote unit (113). Infrastructure equipment (109) utilizes information supplied to it by the external fraud detection equipment (103) and disconnects the fraudulent remote unit (113).

13 Claims, 3 Drawing Sheets

SYSTEM FOR DETECTING A FRAUDULENT REMOTE UNIT WHICH UPON DETECTION PLACES A CALL TO THE CELLULAR INFRASTRUCTURE USING IDENTIFICATION IN FORMATION OF THE FRAUDULENT REMOTE UNIT

FIELD OF THE INVENTION

The present invention relates generally to cellular communication systems and, in particular, to detection of fraudulent users in cellular communication systems.

BACKGROUND OF THE INVENTION

Communication systems are known to comprise a plurality of base sites that provide communication services to remote units located in corresponding service coverage areas of the base sites. A remote unit (e.g., a mobile or stationary remote unit) that desires to communicate, sends a channel request signal and identification information to a base site serving the coverage area in which the remote unit resides. Identification information includes, but is not limited to, a mobile identification number (MIN) and an electronic serial number (ESN). Upon receiving the remote unit's identification information and channel request signal, the serving base site allocates a communication resource for the remote unit. The communication resource comprises a coordinated pair of frequencies (i.e., an uplink frequency and a downlink frequency sometimes referred to as voice or traffic channels). In a communication system employing a Time Division Multiple Access (TDMA) protocol, the communication resource comprises a coordinated pair of time slots and frequencies (i.e., a first time slot at an uplink frequency and a second time slot at a downlink frequency). The uplink frequency supports transmissions from the remote unit to the serving base site, whereas the downlink frequency supports transmissions from the serving base site to the remote unit.

Upon allocating the communication resource, the base site sends a channel designation signal containing the uplink and downlink frequency, to the remote unit via a control channel, and upon receiving the channel designation signal, the remote unit tunes its transmitter and receiver to the designated frequencies and begins communicating with a telephone network subscriber or another remote unit via the serving base site. The serving base site then tracks billing information with respect to the call, and utilizing the remote unit's identification information, charges the appropriate fees to the corresponding caller.

There are many ways in which users can place fraudulent calls, resulting in fees associated with the call being charged to individuals who did not place the call. For example, as described in U.S. application Ser. No. 08/651,230 "Method and Apparatus for Detection of Fraudulent Users in a Communication System Using Signaling-Channel Phase Shift" by W. Willey, a fraudulent remote unit (i.e., a fraudulent user operating a remote unit) may hijack a channel by transmitting on a corresponding uplink frequency at a high enough power level, causing the legitimate remote unit to be abandoned in favor of the fraudulent remote unit. Once communication has been established between the fraudulent remote unit and the communication system, the fraudulent remote unit may then utilize three-party calling features of the communication system to place other calls utilizing the legitimate remote unit's identification information, causing associated fees to be charged to the legitimate remote unit.

Another way in which users can place fraudulent calls is by cellular cloning. Cellular cloning involves procuring a remote unit's identification information and reprogramming a fraudulent remote unit with the obtained identification information. The reprogrammed, or cloned remote unit simply places a call using the identification information of the legitimate remote unit, causing associated fees to be charged to the legitimate remote unit.

There exists many methods in which communication systems can detect the placement of fraudulent calls. Typically each fraud detection method requires specific software and hardware existing within the system's infrastructure equipment, and can be very costly to implement. This can prevent system operators from outfitting existing infrastructure equipment with new fraud detection equipment. Thus a need exists for a method and apparatus for detection of fraudulent users in a communication system that is less costly and does not require outfitting existing infrastructure equipment with additional fraud detection equipment when new fraud detection methods are devised.

DETAILED DESCRIPTION OF THE DRAWINGS

Stated generally, detection of a fraudulent remote unit in a communication system occurs by external fraud detection equipment located external to, and in proximity to a base site. The external fraud detection equipment communicates with the base site via an uplink communication signal and utilizes fraud detection methods not utilized by internal fraud detection equipment to identify the remote unit as being fraudulent. Once the remote unit is identified by the external fraud detection equipment as being fraudulent, the external fraud detection equipment places an origination order to the base site and supplies identification information on the fraudulent remote unit. The infrastructure equipment utilizes information supplied to it by the external fraud detection equipment and disconnects the fraudulent remote unit.

The present invention encompasses a method of detecting a fraudulent remote unit in a communication system by receiving at a point external to cellular infrastructure equipment, a first uplink communication signal transmitted by a remote unit and determining at the point external to the cellular infrastructure equipment, if the first uplink communication signal is transmitted by the fraudulent remote unit. Next, information regarding the fraudulent remote unit is transmitted from the point external to the cellular infrastructure equipment to the cellular infrastructure equipment.

An alternate embodiment of the present invention encompasses a method for detection of a fraudulent remote unit in a communication system, by determining by external fraud detection equipment that the fraudulent remote unit has accessed the communication system and initiating a call by the external fraud detection equipment to cellular infrastructure equipment. The call is then disconnected by the cellular infrastructure equipment based on the call.

A final embodiment of the present invention encompasses an apparatus for detection of fraudulent users in a communication system having a receiver existing external to cellular infrastructure equipment, for receiving an uplink communication signal of a remote unit. The apparatus further includes an internal logic unit existing external to the cellular infrastructure equipment, for determining that the remote unit is a fraudulent remote unit, and a transmitter existing external to the cellular infrastructure equipment, for transmitting information regarding the fraudulent remote unit to the cellular infrastructure equipment.

Figure 1:
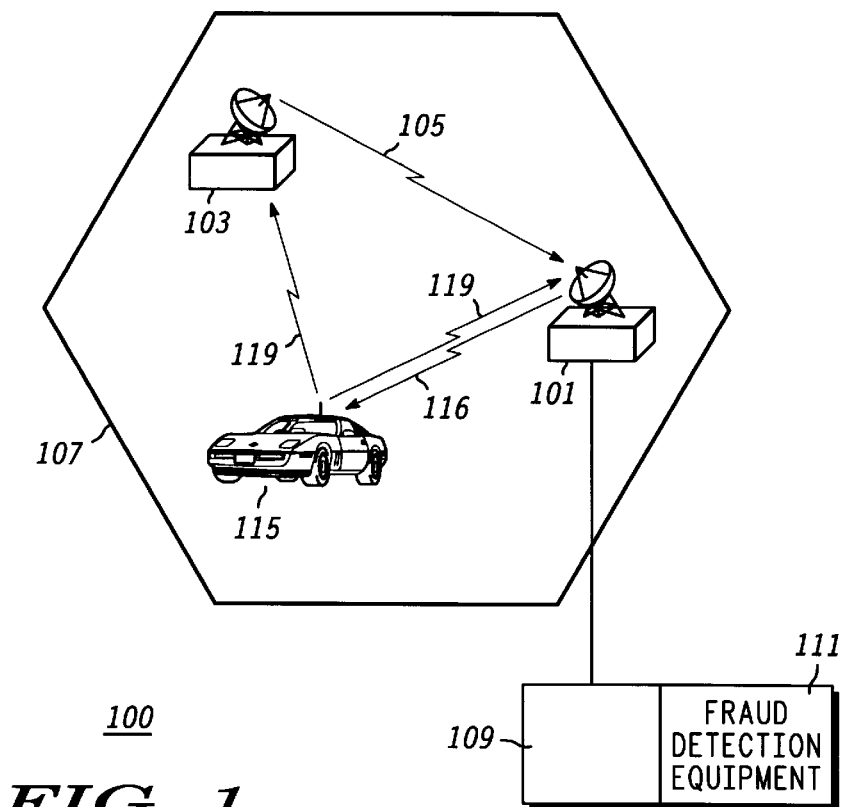
FIG. 1 illustrates a communication system in accordance with the preferred embodiment of the present invention.

FIG. 1 illustrates communication system 100 in accordance with the preferred embodiment of the present invention. Communication system 100 may, for example, be an analog or digital cellular communication system utilizing system protocols such as, but not limited to, the Narrowband Advanced Mobile Phone Service (NAMPS) protocol, the Advanced Mobile Phone Service (AMPS) protocol, the Code Division Multiple Access (CDMA) protocol, the Personal Digital Cellular (PDC) protocol, or the United States Digital Cellular (USDC) protocol. Communication system 100 includes base site 101 having respective service coverage area 107, remote unit 113, external fraud detection equipment 103, and infrastructure equipment 109. In the preferred embodiment of the present invention infrastructure equipment 109 includes a Mobile Switching Center (not shown) a Base site Controller (not shown), and internal fraud detection equipment 111.

As shown, remote unit 113 is communicating with base site 101 and external fraud detection equipment 103 via uplink communication signal 119 and base site 101 is communicating with remote unit 113 via downlink communication signal 116. In the preferred embodiment of the present invention, external fraud detection equipment 103 is located external to, and in proximity to base site 101 and communicates with base site 101 via uplink communication signal 105. Although in the preferred embodiment of the present invention external fraud detection equipment 103 communicates with base site 101 via uplink communication signal 105, in alternate embodiments external fraud detection equipment 103 communicates with base site 101 via landline signaling (such as Signaling System 7). As shown, infrastructure equipment 109 includes internal fraud detection equipment 111 that is preferably a Clone Clear™ fraud detection system supplied by Motorola, Inc. of Schaumburg, Ill., but in alternate embodiments of the present invention other internal fraud detection methods (such as systems to detect overlap billing or systems to detect time and distance discrepancies) may be utilized by internal fraud detection equipment 111.

In order to better illustrate operation of communication system 100, it will be beneficial to describe operation of Motorola's Clone Clear™ fraud detection system. As described in Motorola's "EMX 2500 Features and Enhancements" section number 68P09222A54-O, Motorola's Clone Clear™ feature identifies situations in which two remote units having the same identification information are involved in simultaneous calls. Once it has been determined that an individual remote unit's identification information is being used for simultaneous calls, Clone Clear™ internal fraud detection equipment 111 allows a system operator a choice of options that will minimize a fraudulent remote unit's access to communication system 100.

The first option that Clone Clear™ provides system operators is to force disconnect the first remote unit from communication system 100 once it has been determined that single identification information is being used for simultaneous calls. This option minimizes the overlapping of billing records when a radio frequency (RF) loss or interference on a base site channel occurs, and the legitimate remote unit reaccesses communication system 100. This option causes any valid subscriber and fraudulent subscriber to compete for air time; the thought being that the valid subscriber may report the problem to the system operator.

The second option that Clone Clear™ provides system operators is to block origination of the second remote unit once it has been determined that single identification information is being used for simultaneous calls. In the preferred embodiment of the present invention, the second remote unit is connected to a service that notifies the remote unit of why the call origination was not completed. Like the first option, the second option causes the valid subscriber to compete for air time; the thought being that the valid subscriber may report the problem to the system operator.

The third option that Clone Clear™ provides system operators is to let both calls continue and monitor billing information once it has been determined that the same identification information is being used for simultaneous calls. This option is chosen when a system operator does not wish to interfere with calls of legitimate subscribers, but they do wish to have a mechanism to help track potential fraudulent users, and take the appropriate action if the legitimate subscriber notifies the system operator of billing discrepancies.

Figure 2:
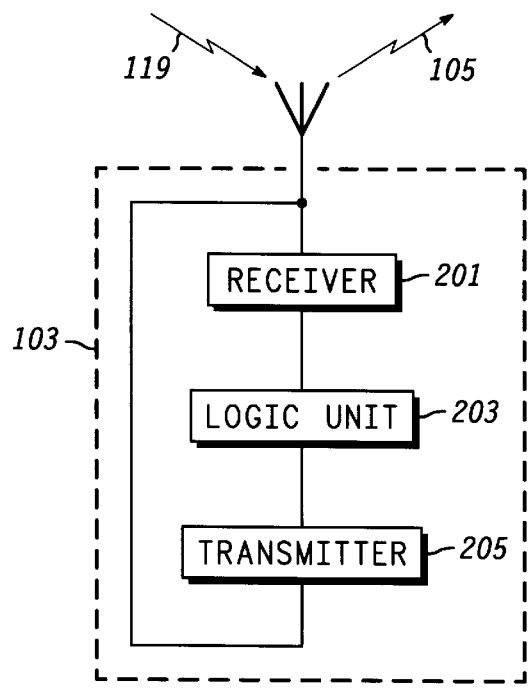
FIG. 2 is a block diagram of the external fraud detection equipment of FIG. 1 in accordance with the preferred embodiment of the present invention.

FIG. 2 is a block diagram of external fraud detection equipment 103 of FIG. 1 in accordance with the preferred embodiment of the present invention. External fraud detection equipment 103 comprises receiver 201, logic unit 203, and transmitter 205. Operation of external fraud detection equipment 103 in accordance with the preferred embodiment of the present invention occurs as follows:

Remote unit 113, which for the purposes of this discussion is a fraudulent remote unit, begins communication with base site 101 and external fraud detection equipment 103 via uplink communication signal 119. External fraud detection equipment 103, utilizing receiver 201, receives communication signal 119. Communication signal 119 is then analyzed via logic unit 203 to determine if remote unit 113 is fraudulent. In the preferred embodiment of the present invention logic unit 203 utilizes fraud detection methods not utilized by internal fraud detection equipment 111. Also, in the preferred embodiment of the present invention, external fraud detection logic unit 203 utilizes an RF fingerprinting technique to identify fraudulent remote unit 113, but other fraud detection methods (for example, methods to detect overlap billing or time and distance discrepancies) can be utilized as well. RF fingerprinting is described in the Phoneprint™ System Description entitled "Cellular Fraud Control" published by Corsair Communications and is incorporated by reference herein. Corsair Communications can be reached at 207 Java Drive, Sunnyvale, Calif. 94089.

Once logic unit 203 determines that remote unit 113 is fraudulent, external fraud detection equipment 103 utilizes transmitter 205 to initiate a call (sometimes referred to as an origination order) to infrastructure equipment 109 via uplink communication signal 105. In the preferred embodiment of the present invention, the call is initiated utilizing the fraudulent remote unit's 113 identification information and with the appropriate system protocol.

After call initiation by external fraud detection equipment 103, internal fraud detection equipment 111 (Clone Clear™) identifies that two remote units having the same identification information are involved in simultaneous calls. Once it has been determined that a single remote unit's identification information is being used for simultaneous calls, Clone Clear™ internal fraud detection equipment 111 allows the system operator a choice of options (discussed above) that will minimize the fraudulent remote unit's 113 access to communication system 100. In the preferred embodiment of the present invention, internal fraud detection equipment 111 will force disconnect the first remote unit to access communication system 100 (in this case, remote unit 113). By utilizing external fraud detection equipment 103, specific fraud detection software and hardware can exist external to the communication system's infrastructure equipment. This provides for detection of fraudulent users in a communication system that is less costly and does not require outfitting existing infrastructure equipment with additional fraud detection equipment when new fraud detection methods are devised.

Figure 3:
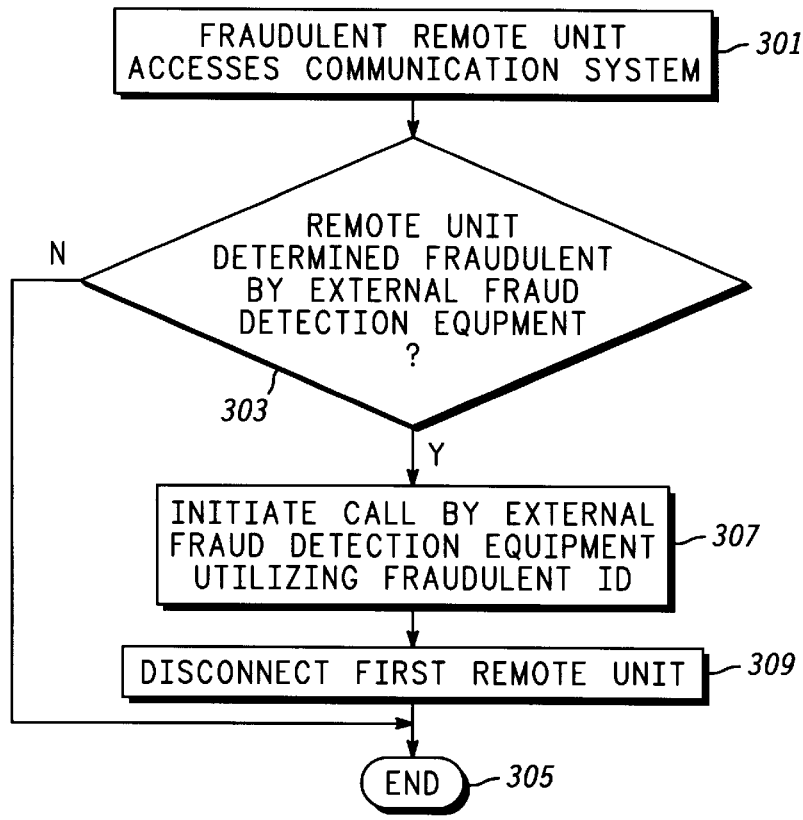
FIG. 3 is a flow chart illustrating operation of the external fraud detection equipment of FIG. 1 in accordance with a preferred embodiment of the present invention.

FIG. 3 is a flow chart illustrating operation of communication system 100 in accordance with the preferred embodiment of the present invention. The logic flow begins at step 301 where remote unit 113 accesses communication system 100. At step 303 external fraud detection equipment 103 determines if remote unit 113 is fraudulent. As discussed above, in the preferred embodiment of the present invention external fraud detection equipment 103 utilizes fraud detection methods not utilized by internal fraud detection equipment 111 to determine if remote unit 113 is fraudulent. If at step 303, external fraud detection equipment 103 determines that remote unit 113 is not fraudulent, then at step 305 the logic flow ends. If at step 303, external fraud detection equipment 103 determines that remote unit 113 is fraudulent, then at step 307 external fraud detection equipment 103 initiates a call via uplink communication signal 105. In the preferred embodiment of the present invention, external fraud detection equipment 103 utilizes fraudulent remote unit's 113 identification information when placing the call. Next, at step 309 internal fraud detection equipment 111, utilizing Motorola's Clone Clear™ fraud detection feature, determines that two simultaneous calls are being placed utilizing the same identification information, and disconnects fraudulent remote unit 113 and the logic flow ends at step 305.

Figure 4:
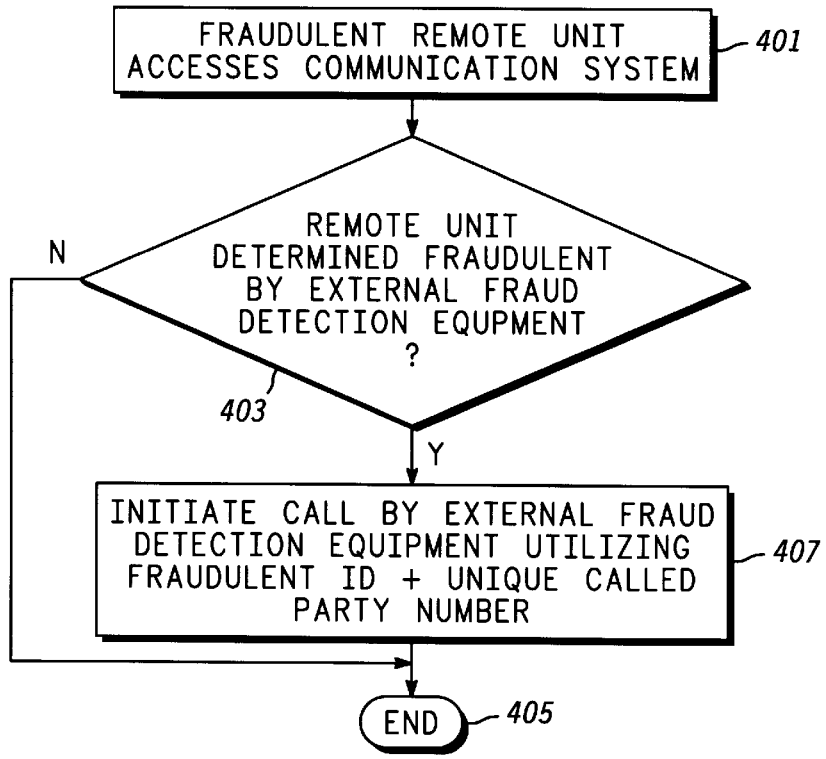
FIG. 4 is a flow chart illustrating operation of the internal fraud detection equipment of FIG. 1 in accordance with an alternate embodiment of the present invention.

FIG. 4 is a flow chart illustrating operation of external fraud detection equipment 103 of FIG. 1 in accordance with an alternate embodiment of the present invention. In an alternate embodiment, external fraud detection equipment 103 accesses communication system 100 (originates a call) and supplies infrastructure equipment 109 with notification that remote unit 113 is fraudulent. In the alternate embodiment, external fraud detection equipment 103 supplies infrastructure equipment 109 with a unique called party number instructing internal fraud detection equipment 111 that the second call was placed by external fraud detection equipment 103. For example, a system provider might instruct internal fraud detection equipment 111 to block origination of the second remote unit to access communication system 100 unless a particular called number is placed by the second remote unit, identifying the second remote unit as external fraud detection equipment 103. Once the second remote unit has been identified as fraud detection equipment 103, fraud detection equipment 111 will force disconnect the first remote unit to access communication system 100.

The logic flow begins at step 401 where remote unit 113 accesses communication system 100. At step 403 external fraud detection equipment 103 determines if remote unit 113 is fraudulent. In the alternate embodiment of the present invention external fraud detection equipment 103 utilizes fraud detection methods not utilized by internal fraud detection equipment 111 to determine if remote unit 113 is fraudulent. If at step 403, external fraud detection equipment 103 determines that remote unit 113 is not fraudulent, then at step 405 the logic flow ends. If at step 403, external fraud detection equipment 103 determines that remote unit 113 is fraudulent, then at step 407 external fraud detection equipment 103 initiates a call via uplink communication signal 105. The initiated call utilizes fraudulent remote unit's 113 identification information and has a unique called party number that identifies the second call as being originated from external fraud detection equipment 103. Next, the logic flow ends at step 405.

Figure 5:
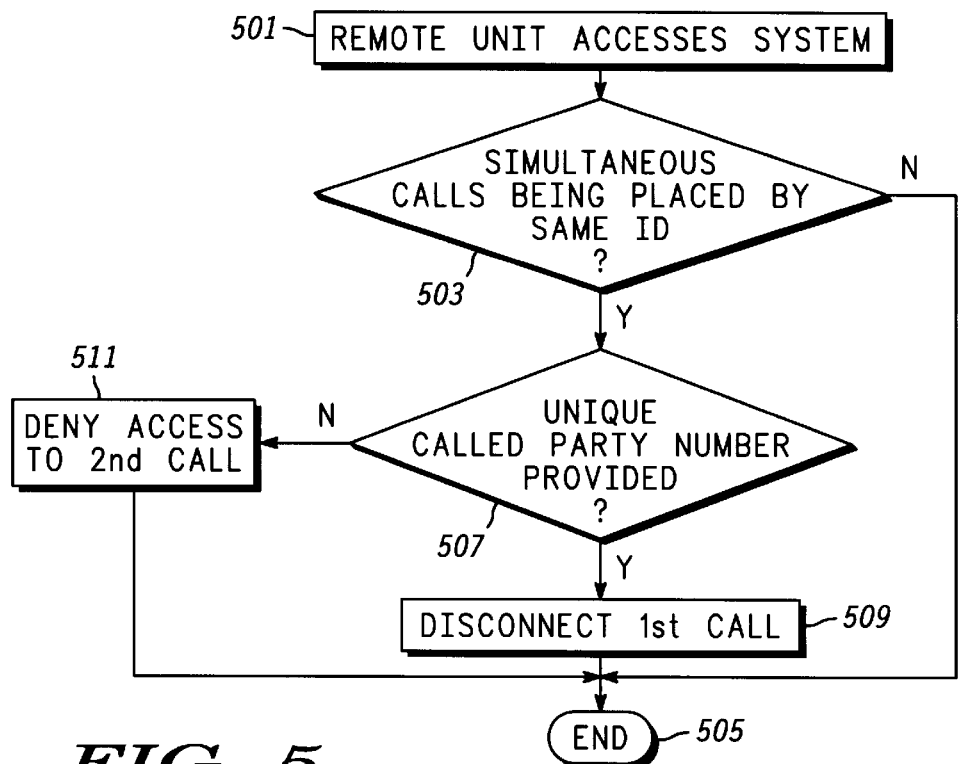
FIG. 5 is a flow chart illustrating operation of the external and internal fraud detection equipment of FIG. 1 in accordance with a second alternate embodiment of the present invention.

FIG. 5 is a flow chart illustrating operation of the internal fraud detection equipment of FIG. 1 in accordance with an alternate embodiment of the present invention. The logic flow begins at step 501 where a remote unit accesses communication system 100. Next, at step 503 internal fraud detection equipment 111 determines if the remote unit's identification information is involved in two simultaneous calls, and if not, the logic flow ends at step 505. If fraud detection equipment 111 determines that the remote unit's identification information is involved in two simultaneous calls, then the logic flow continues to step 507 where fraud detection equipment 111 determines if a unique called party number has been provided by the remote unit, identifying it as external fraud detection equipment 103. If at step 507 internal fraud detection equipment determines that a unique called party number was provided, then at step 509 the first call is disconnected, otherwise at step 511 the second call is disconnected. The logic flow then ends at step 505.

Figure 6:
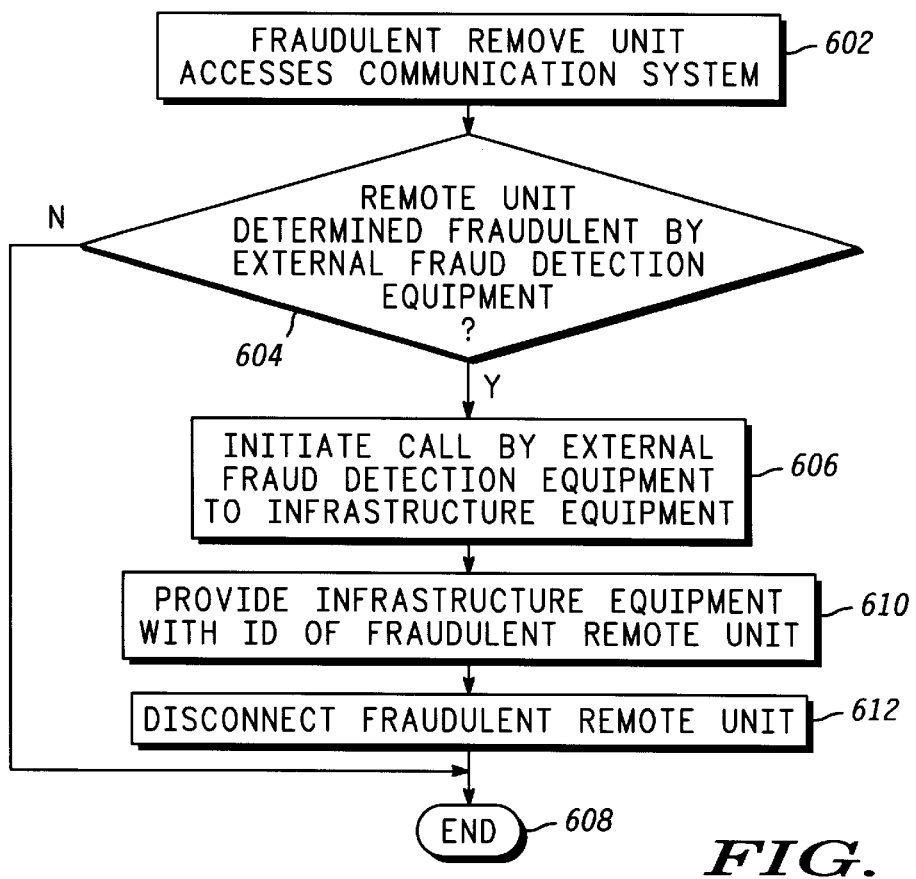
FIG. 6 is a flow chart illustrating operation of the external and internal fraud detection equipment of FIG. 1 in accordance with a second alternate embodiment of the present invention.

FIG. 6 is a flow chart illustrating operation of external and internal fraud detection equipment of FIG. 1 in accordance with a second alternate embodiment of the present invention. In this embodiment external fraud detection equipment 103 detects fraudulent remote unit 113 and originates a call to base site 101 identifying remote unit 113 as being fraudulent. Unlike the previous embodiments of the present invention, external fraud detection equipment 103 does not originate a call utilizing the same identification information as remote unit 113, but utilizes unique identification information that identifies itself to infrastructure equipment 109. Once external fraud detection equipment 103 has been identified to infrastructure equipment 109, external fraud detection equipment 103 notifies infrastructure equipment 109 that fraudulent remote unit 113 has accessed communication system 100.

The logic flow begins at step 602 where fraudulent remote unit 113 accesses communication system 100. At step 604 external fraud detection equipment 103 determines if remote unit 113 is fraudulent, and if not, the logic flow ends at step 608. If at step 604 external fraud detection equipment 103 determines that remote unit 113 is fraudulent then at step 606 external fraud detection equipment 103 originates a call to infrastructure equipment 109 via base site 101. Next, at step 610, external fraud detection equipment 103 provides infrastructure equipment 109 with identification information on remote unit 113. At step 612, fraudulent remote unit 113 is disconnected from communication system 100 and the logic flow ends at step 608.

By utilizing external fraud detection equipment 103, specific fraud detection software and hardware can exist external to the communication system's infrastructure equipment. This provides for detection of fraudulent users in a communication system that is less costly and does not require outfitting existing infrastructure equipment with additional fraud detection equipment when new fraud detection methods are devised.

The descriptions of the invention, the specific details, and the drawings mentioned above, are not meant to limit the scope of the present invention. It is the intent of the inventors that various modifications can be made to the present invention without varying from the spirit and scope of the invention, and it is intended that all such modifications come within the scope of the following claims.

What is claimed is:

1. A method of detecting a fraudulent remote unit in a communication system, the method comprising the steps of:

receiving at fraud detection equipment external to cellular infrastructure equipment, a first uplink communication signal transmitted by a remote unit;

determining at the fraud detection equipment, if the first uplink communication signal is transmitted by the fraudulent remote unit; and originating a call by the fraud detection equipment utilizing identification information of the fraudulent remote unit such that fraud detection equipment internal to the cellular infrastructure equipment will perceive that two remote units having the same identification information are involved in simultaneous calls.

2. The method of claim 1 wherein the step of determining comprises the steps of:

determining at the point external to the cellular infrastructure equipment, that the remote unit has accessed the communication system; and identifying at the point external to the cellular infrastructure equipment, identification information of the fraudulent remote unit.

3. The method of claim 1 further comprising the steps of:

receiving by the cellular infrastructure equipment, notification that the remote unit is fraudulent; and disconnecting the remote unit from the communication system based on the step of receiving.

4. The method of claim 3 wherein the step of disconnecting the remote unit from the communication system comprises the steps of:

identifying that two simultaneous calls are being placed utilizing a same identification information; and disconnecting the remote unit based on the step of identifying.

5. The method of claim 3 wherein the step of disconnecting comprises the steps of:

receiving by the cellular infrastructure equipment, the notification;

determining from the notification, an identification of the fraudulent remote unit; and disconnecting the fraudulent remote unit based on the identification of the fraudulent remote unit.

6. A method for detection of a fraudulent remote unit in a communication system, the method comprising the steps of:

determining by external fraud detection equipment that the fraudulent remote unit has accessed the communication system;

initiating a call by the external fraud detection equipment to cellular infrastructure equipment such that the step of initiating will cause fraud detection equipment internal to the cellular infrastructure equipment to perceive that two remote units having the same identification information are involved in simultaneous calls; and disconnecting the fraudulent remote unit by the cellular infrastructure equipment based on the call.

7. The method of claim 6 wherein the step of determining comprises the steps of:

determining by the external fraud detection equipment that the fraudulent remote unit has accessed the communication system; and identifying by the external fraud detection equipment, identification information of the fraudulent remote unit.

8. The method of claim 7 wherein the step of initiating the call by the external fraud detection equipment comprises the step of initiating the call utilizing the identification information of the fraudulent remote unit.

9. The method of claim 6 wherein the step of disconnecting comprises the steps of:

identifying that two simultaneous calls are being placed utilizing a same identification information; and disconnecting the fraudulent remote unit based on the step of identifying.

10. The method of claim 6 wherein the step of disconnecting the call by the cellular infrastructure equipment comprises the steps of:

receiving by the cellular infrastructure equipment, a notification from the external fraud detection equipment;

determining from the notification, an identification of the fraudulent remote unit; and disconnecting the fraudulent remote unit based on the identification of the fraudulent remote unit.

11. An apparatus for detection of fraudulent users in a communication system, the apparatus comprising:

a receiver existing external to cellular infrastructure equipment, for receiving an uplink communication signal of a remote unit;

an internal logic unit existing external to the cellular infrastructure equipment, for determining that the remote unit is a fraudulent remote unit; and a transmitter existing external to the cellular infrastructure equipment, for transmitting information regarding the fraudulent remote unit to the cellular infrastructure equipment, the information transmitted causing the cellular infrastructure equipment to perceive that two remote units having the same identification information are involved in simultaneous calls.

12. The apparatus of claim 11 wherein the internal logic unit utilizes a radio frequency (RF) fingerprinting technique to determine that the remote unit is a fraudulent remote unit.

13. The apparatus of claim 11 wherein the internal logic unit utilizes fraud detection methods not utilized by internal fraud detection equipment existing within the cellular infrastructure equipment to determine that the remote unit is a fraudulent remote unit.

\* \* \* \* \*